United States Patent
Welch

[11] Patent Number: 5,823,878
[45] Date of Patent: Oct. 20, 1998

[54] GOLF SWING ANALYSIS APPARATUS AND METHOD

[76] Inventor: Christian M. Welch, 825 S. U.S. Hwy. 1, Ste. 200, Jupiter, Fla. 33071

[21] Appl. No.: 709,321

[22] Filed: Sep. 4, 1996

[51] Int. Cl.$^6$ .................................................... A63B 69/36
[52] U.S. Cl. .............................................. 463/43; 473/222
[58] Field of Search .................................. 463/43, 44, 45; 473/219, 221, 222, 223, 266, 269, 276, 409

[56] References Cited

U.S. PATENT DOCUMENTS

| | | | |
|---|---|---|---|
| 4,337,049 | 6/1982 | Connelly | 473/266 |
| 5,210,603 | 5/1993 | Sabin . | |
| 5,249,967 | 10/1993 | O'Leary et al. . | |
| 5,333,061 | 7/1994 | Nakashima et al. . | |
| 5,333,186 | 7/1994 | Gupta . | |
| 5,342,054 | 8/1994 | Chang et al. . | |
| 5,419,562 | 5/1995 | Cromarty . | |
| 5,575,719 | 11/1996 | Gobush et al. | 473/223 |
| 5,609,534 | 3/1997 | Gebhardt et al. | 473/409 |

*Primary Examiner*—George Manuel
*Attorney, Agent, or Firm*—McHale & Slavin

[57] ABSTRACT

A golf analysis apparatus and method which uses videotaping equipment to capture golf swing motions from at least two different angles, and video processing equipment to isolate video frames for global, three-dimensional orientation of chosen points on the test subject. The points are compiled and used to calculate such parameters as clubhead lag and resultant clubhead velocity, body segment rotations, joint range of motion, spine angle, and center of mass versus center of pressure. Velocity data is used to calculate acceleration data. Such velocity and parameter data is then plotted simultaneously as part of an analysis method to determine and optimize the kinetic link between various body parts. For example, by locating the peaks of simultaneously plotted hip, shoulder, arm, and club release speed data, it can be determined if such peaks occur in the proper sequence for translating maximum power through the swing. Inefficiencies in each body segment motion can be addressed and corrected until an optimum kinetic link is achieved.

14 Claims, 19 Drawing Sheets

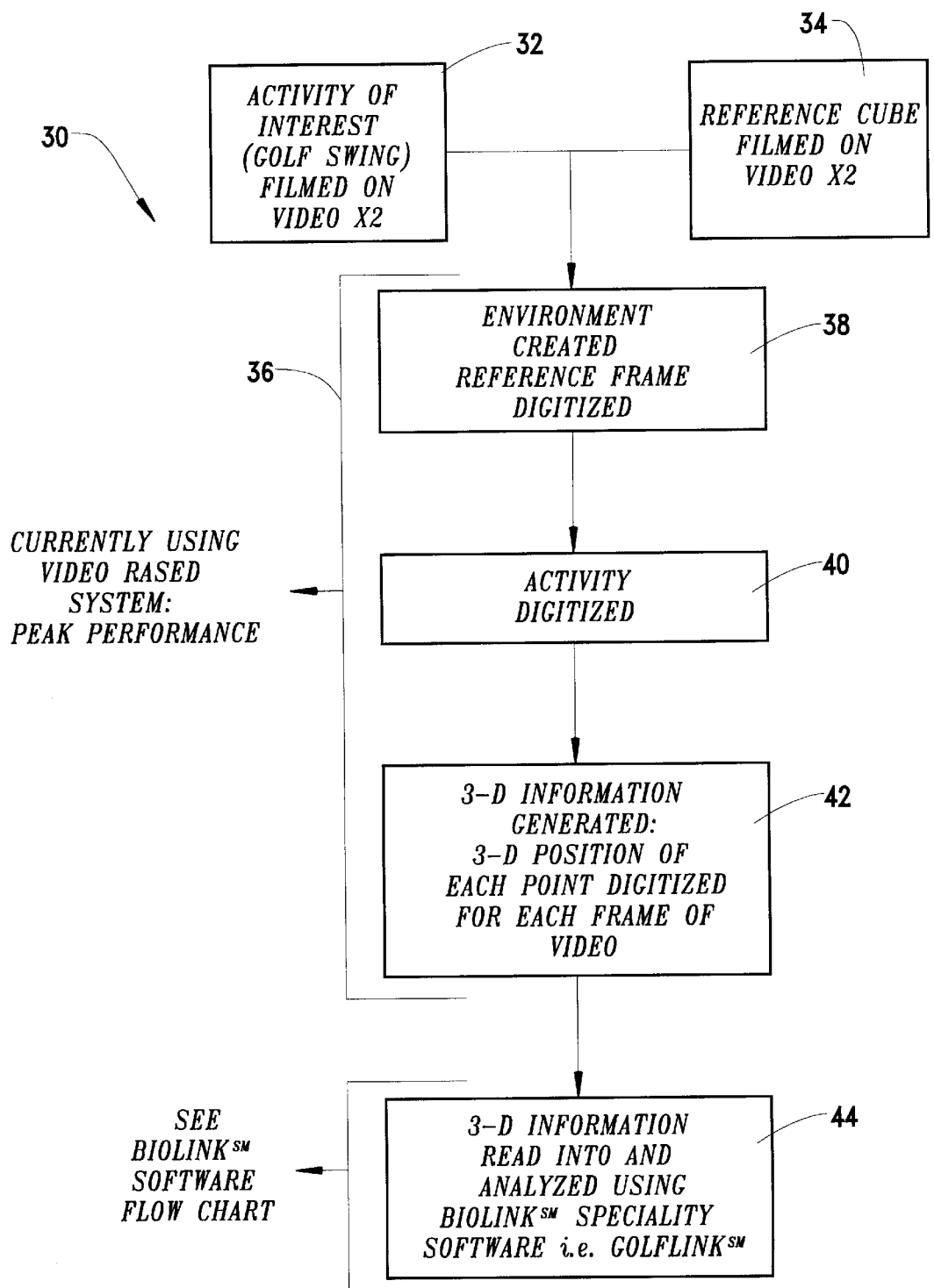

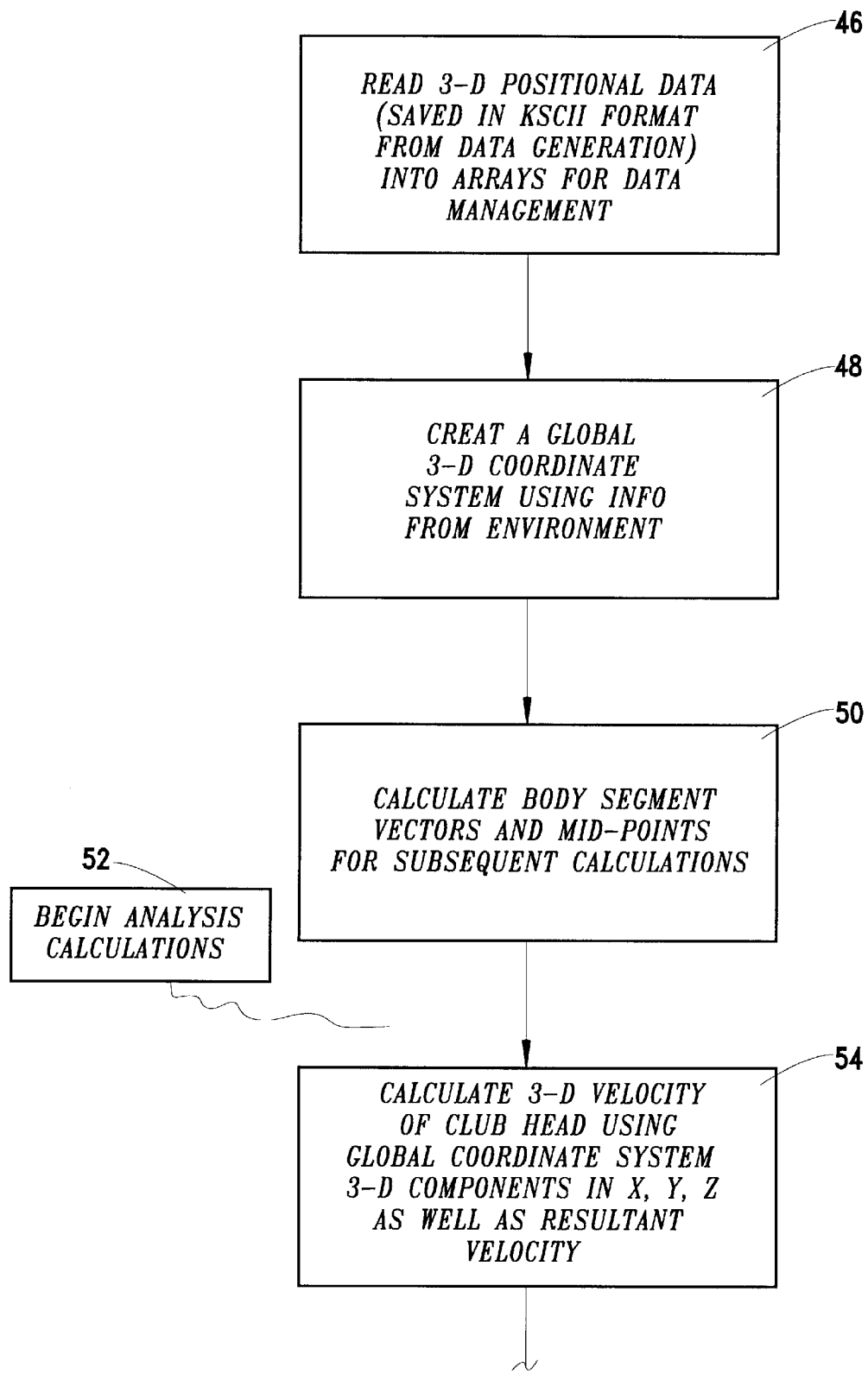

CLUB LAG, FLOW CHART A.

BODY SEGMENT ROTATION, FLOW CHART B.

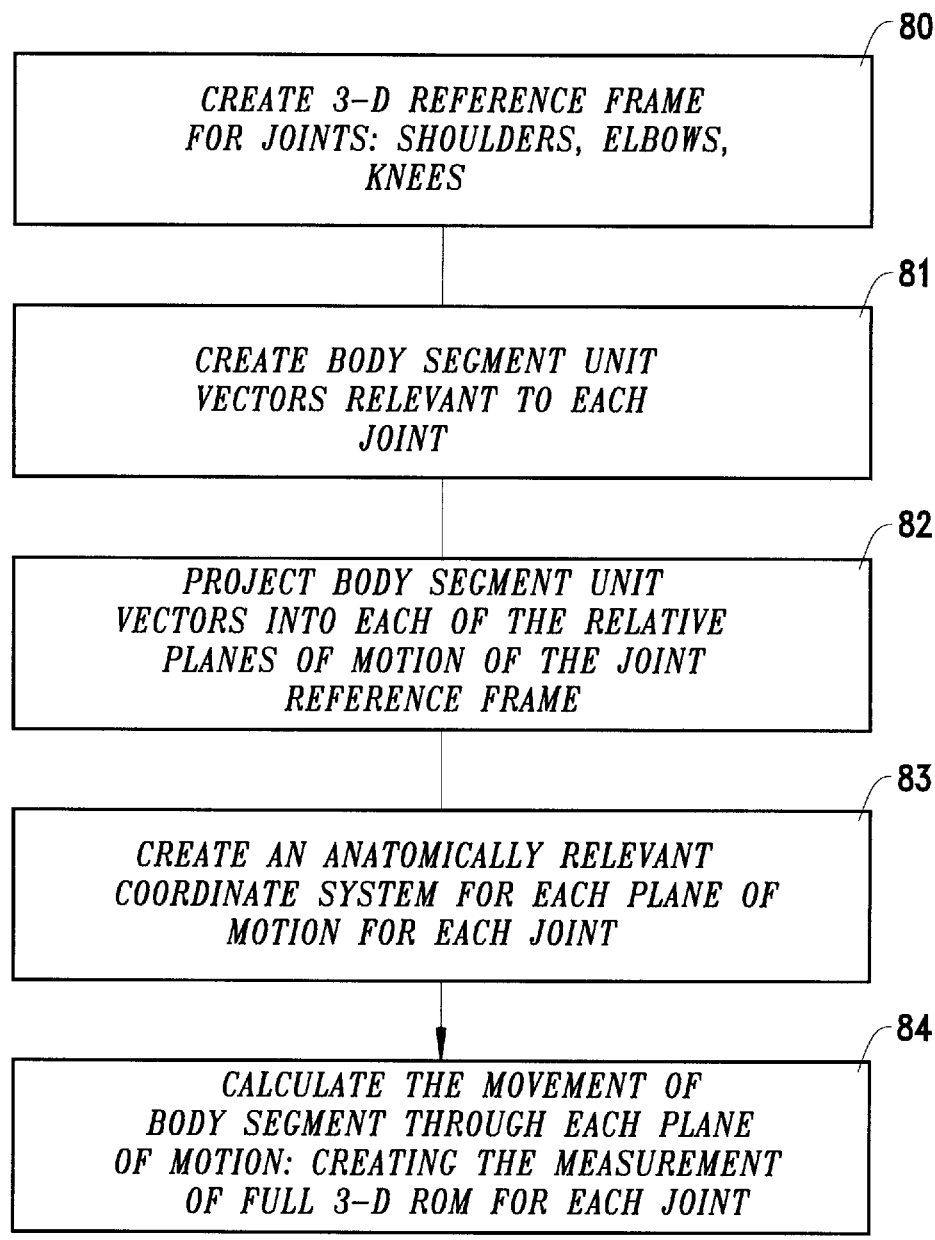

FIG. 3E
SPINE ANGLE 1, FLOW CHART D1.

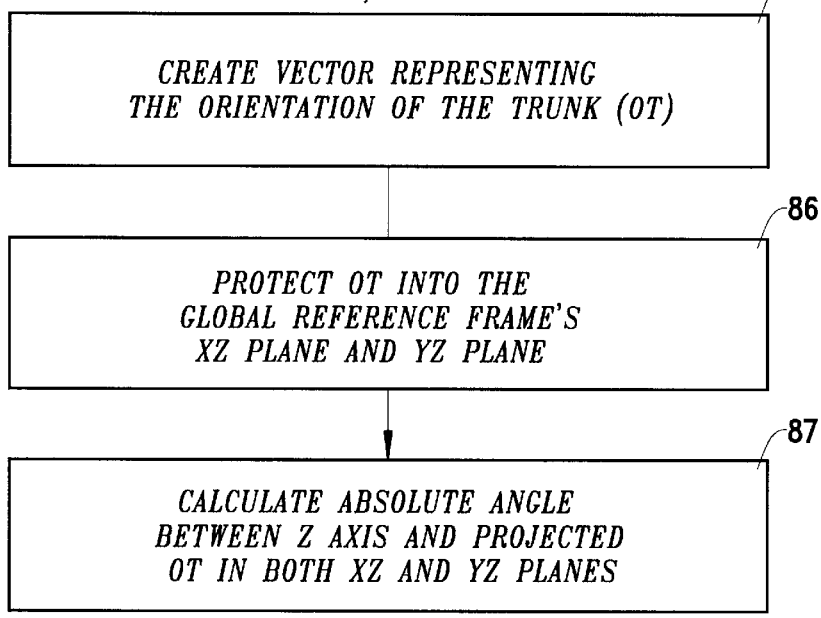

- 85: CREATE VECTOR REPRESENTING THE ORIENTATION OF THE TRUNK (OT)
- 86: PROTECT OT INTO THE GLOBAL REFERENCE FRAME'S XZ PLANE AND YZ PLANE
- 87: CALCULATE ABSOLUTE ANGLE BETWEEN Z AXIS AND PROJECTED OT IN BOTH XZ AND YZ PLANES

FIG. 3F
SPINE ANGLE 2, FLOW CHART D2.

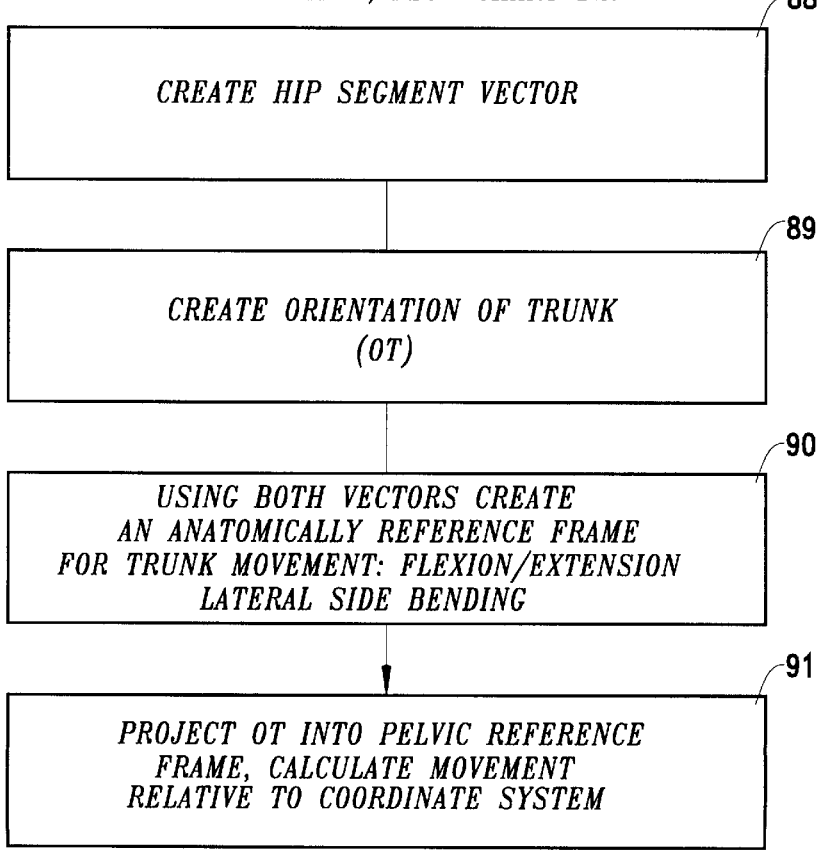

- 88: CREATE HIP SEGMENT VECTOR
- 89: CREATE ORIENTATION OF TRUNK (OT)
- 90: USING BOTH VECTORS CREATE AN ANATOMICALLY REFERENCE FRAME FOR TRUNK MOVEMENT: FLEXION/EXTENSION LATERAL SIDE BENDING
- 91: PROJECT OT INTO PELVIC REFERENCE FRAME, CALCULATE MOVEMENT RELATIVE TO COORDINATE SYSTEM

CENTER OF PRESSURE VS. CENTER OF MASS, FLOW CHART E.

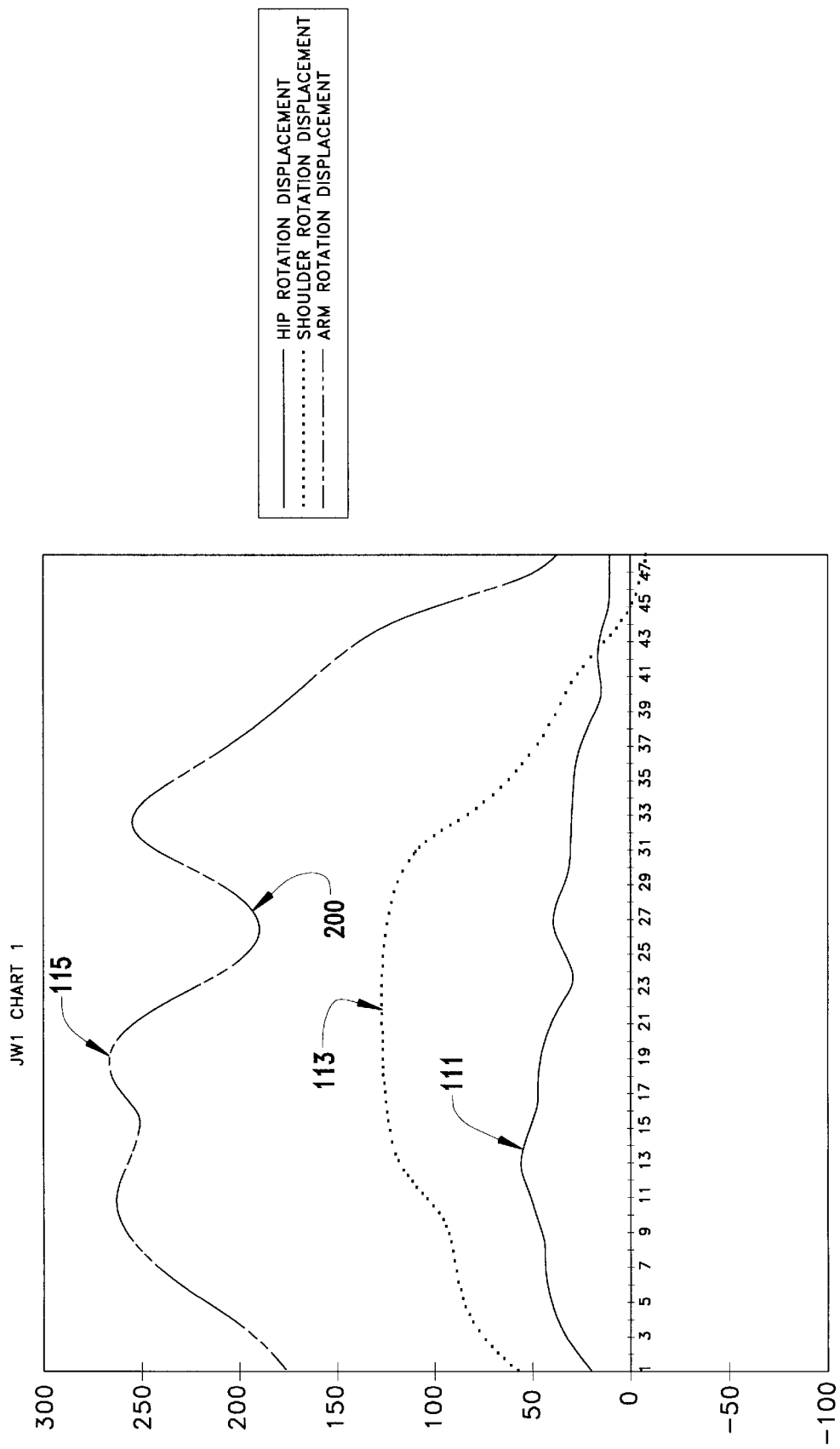

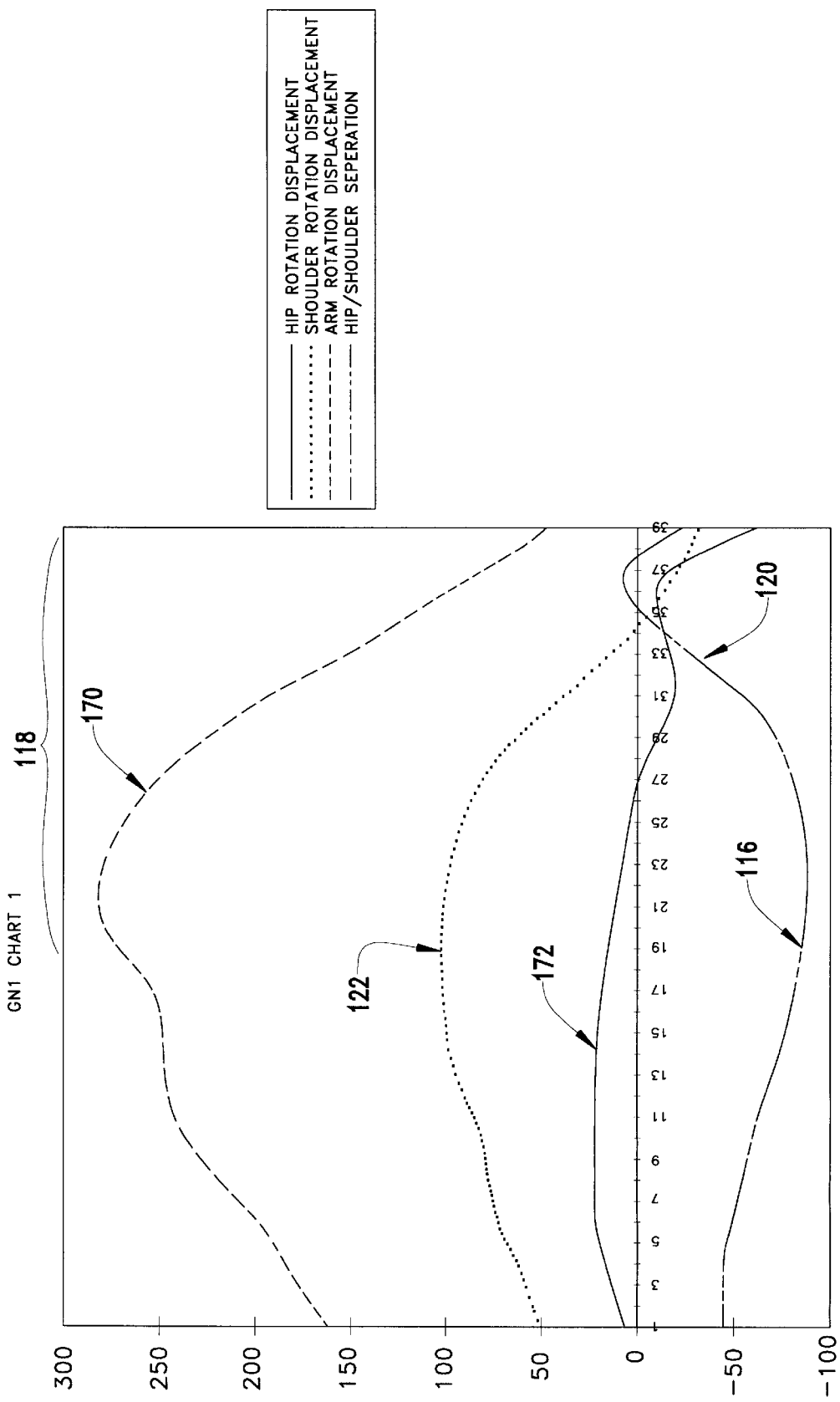

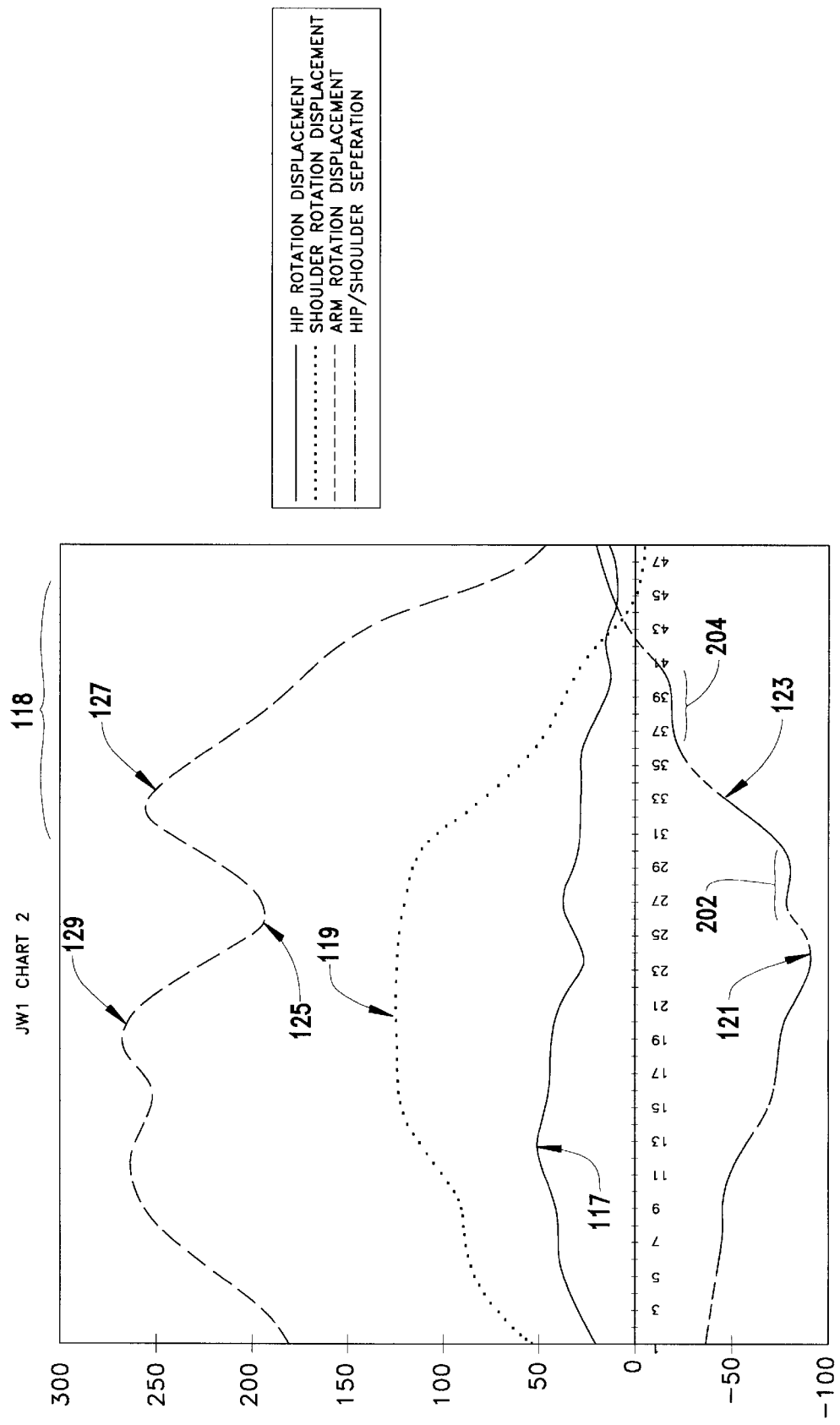

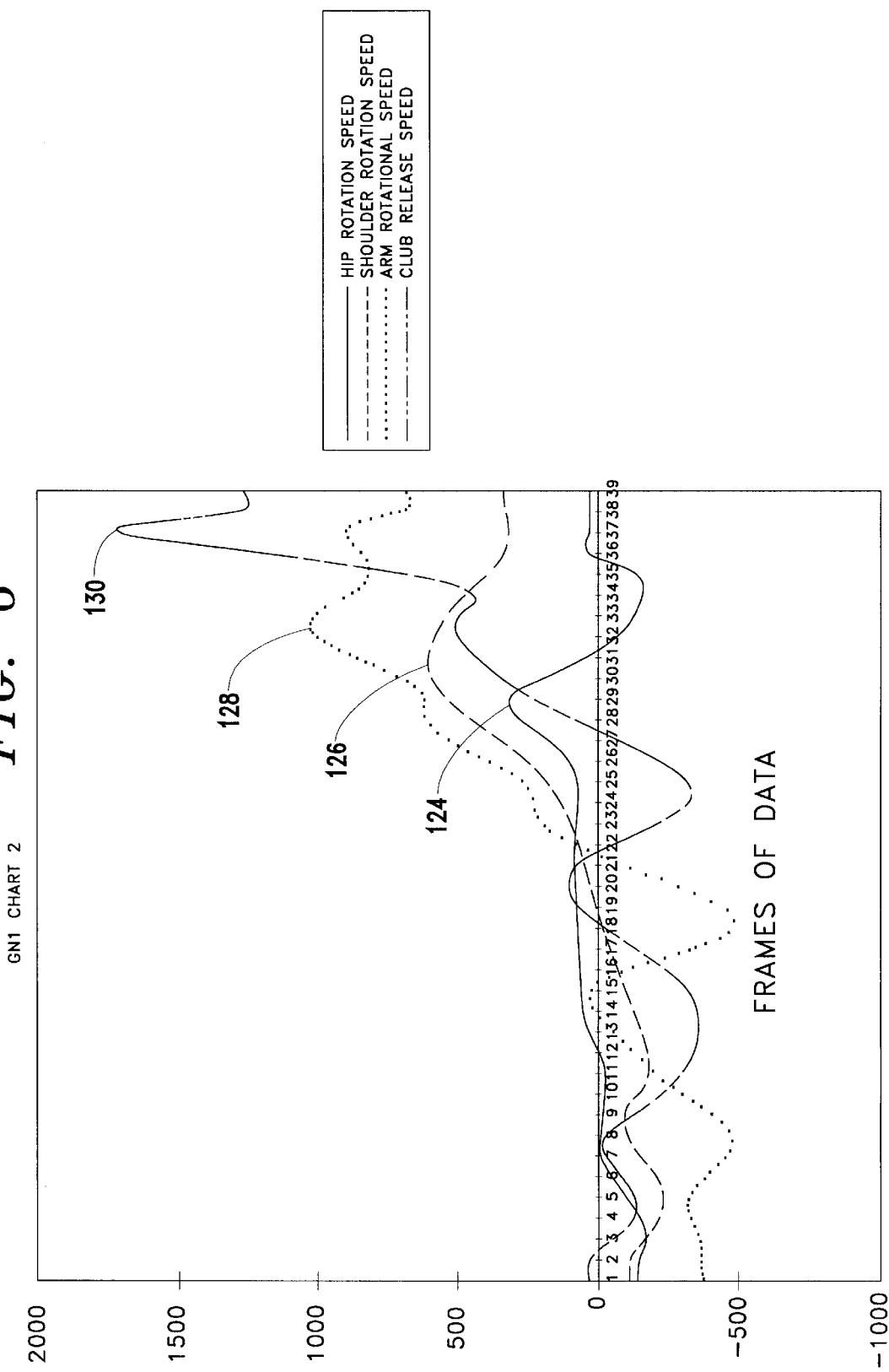

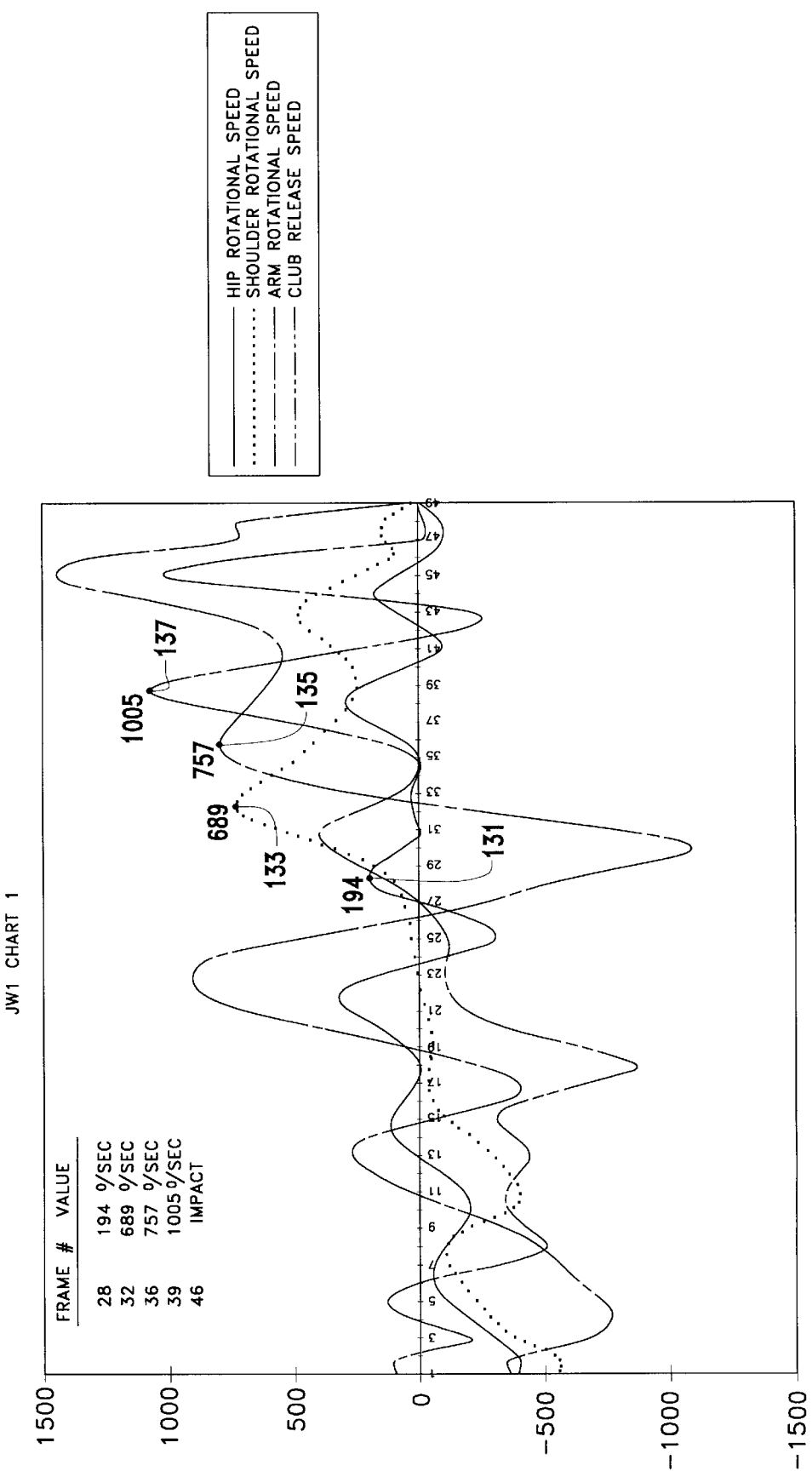

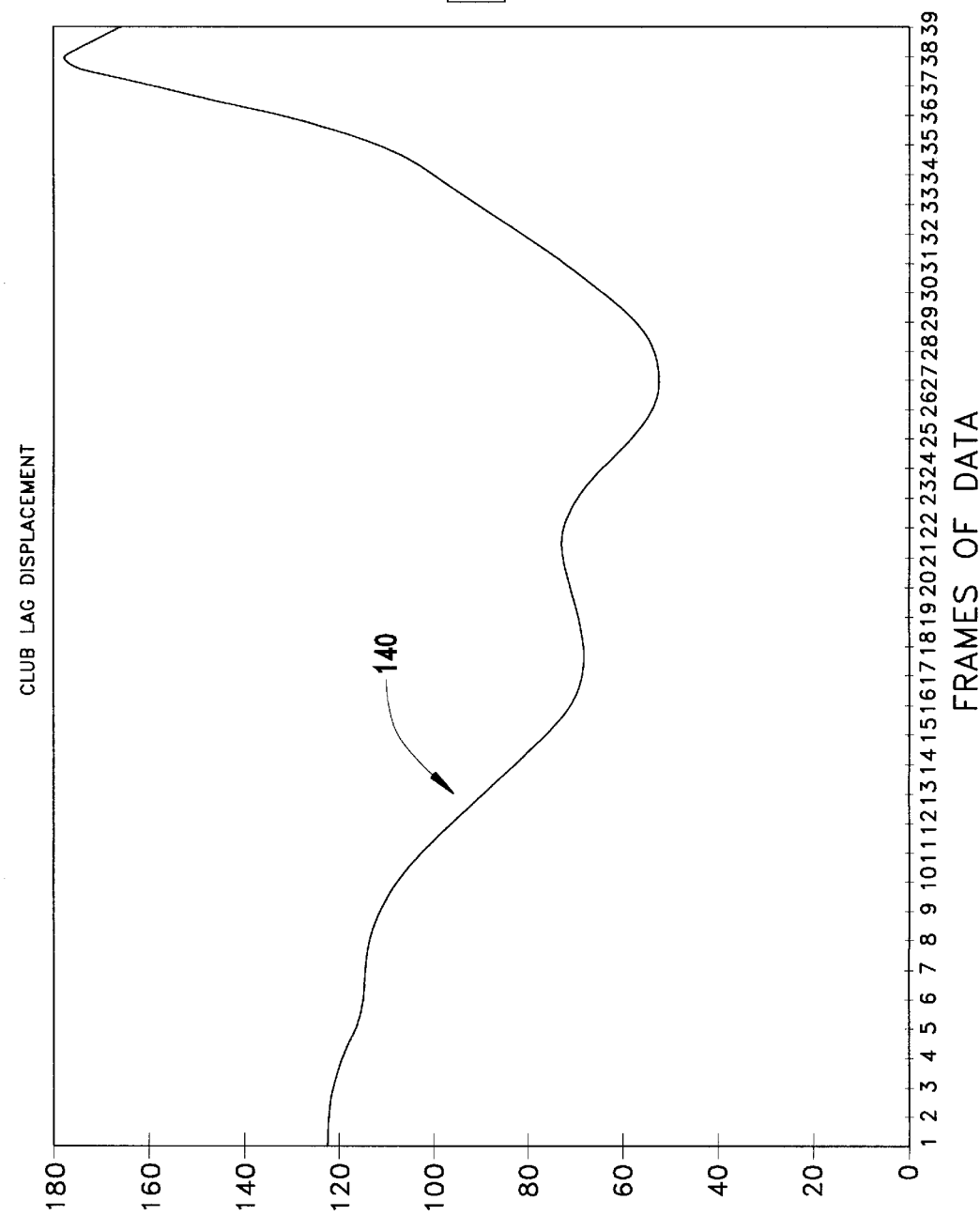

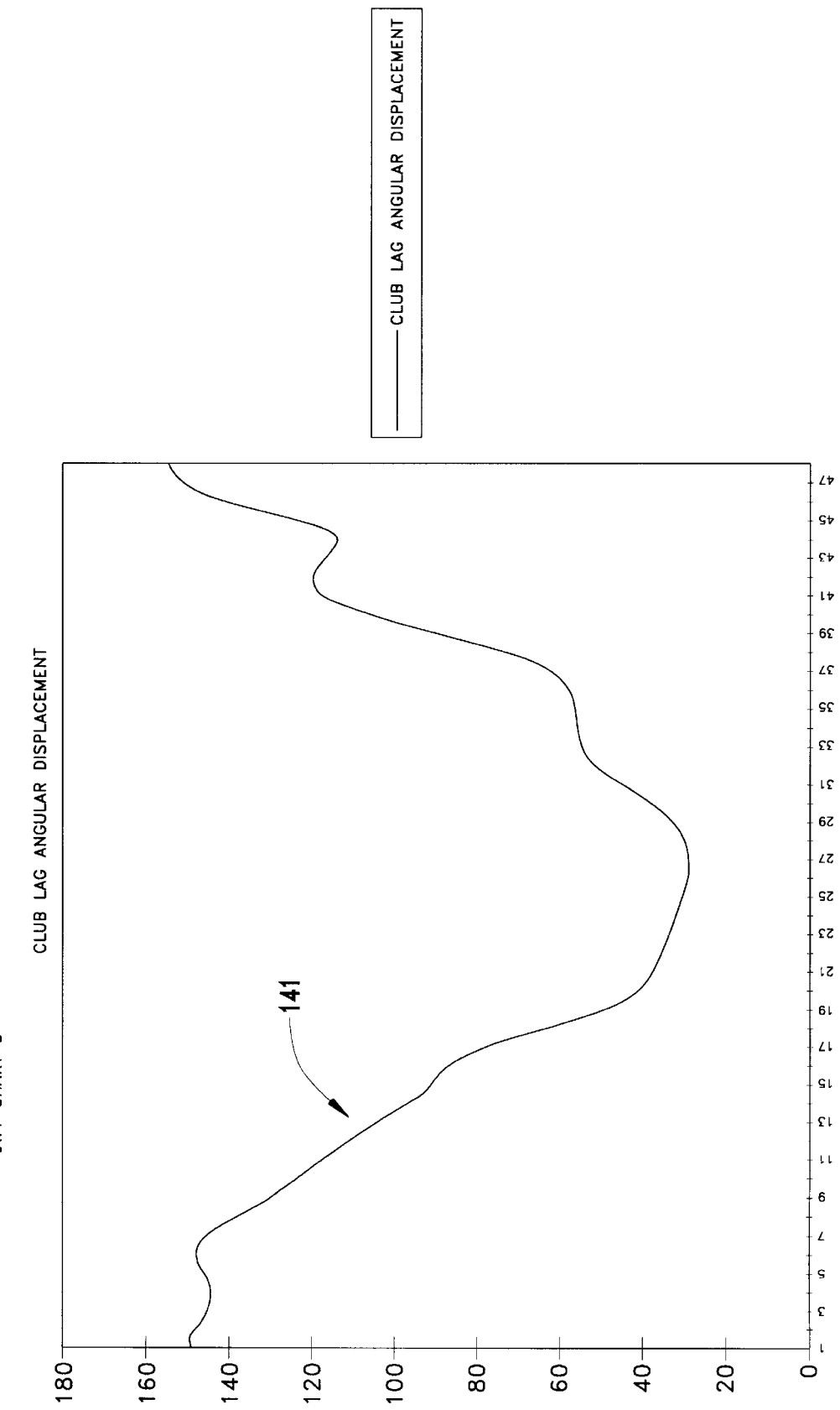

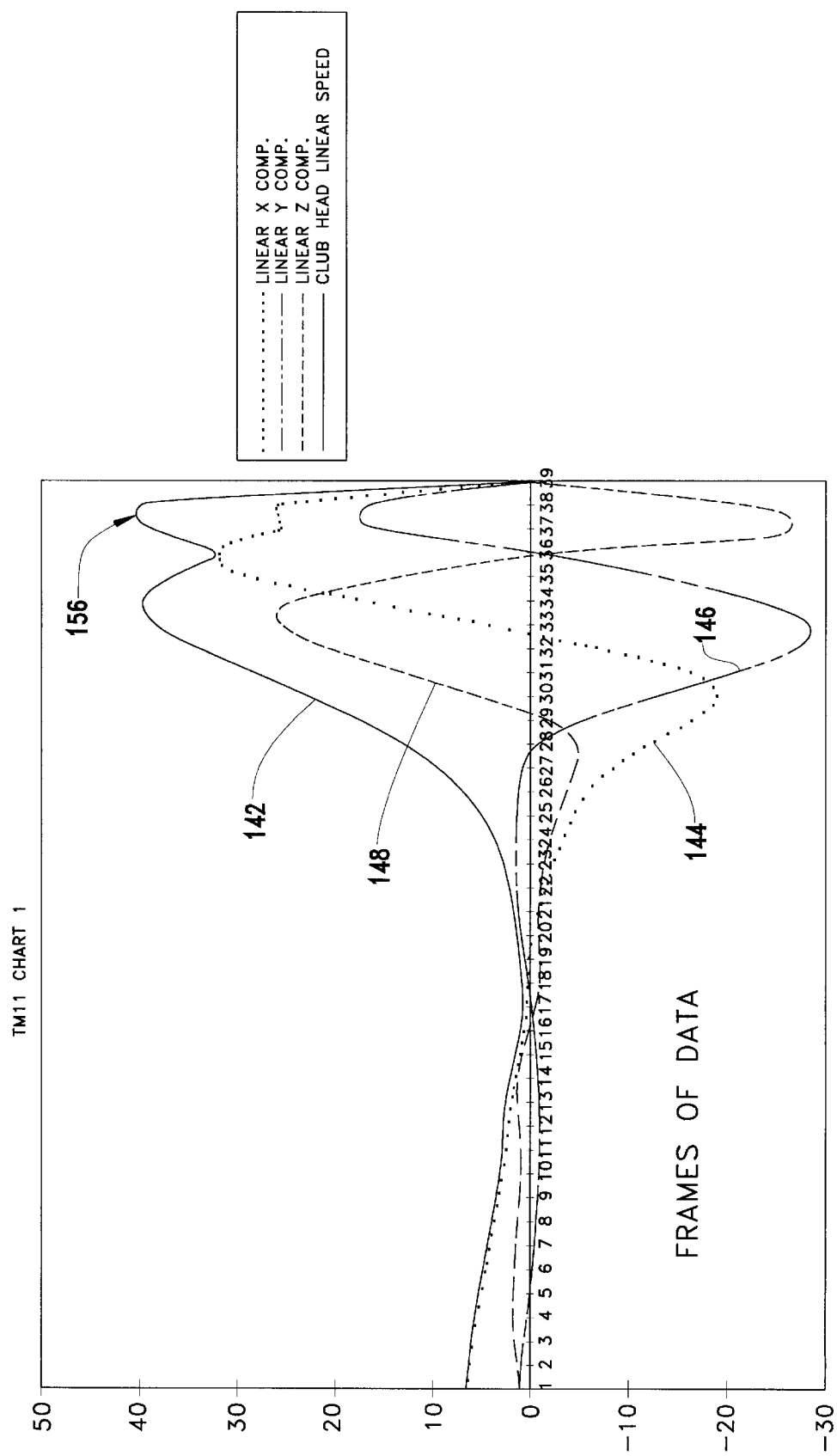

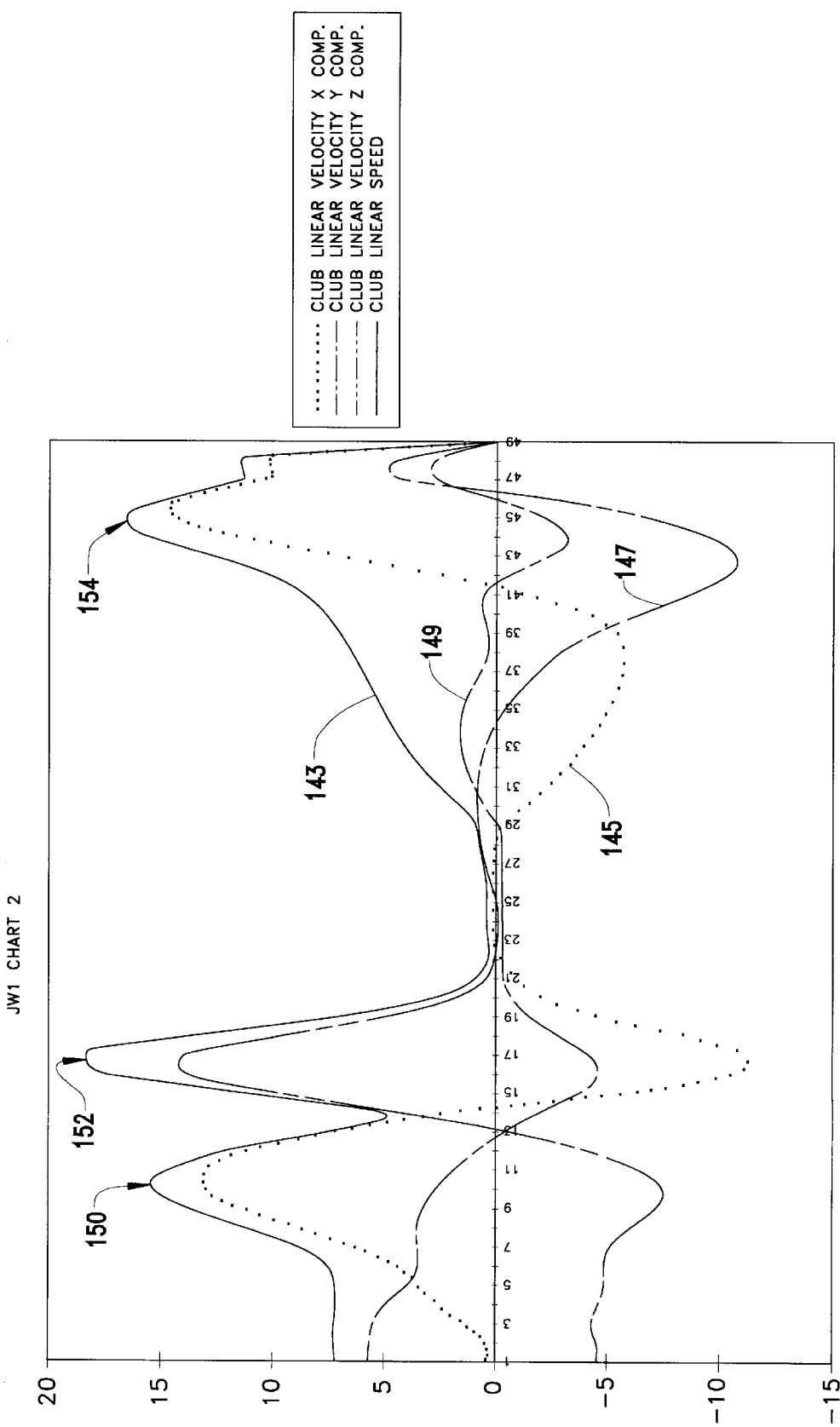

GOLF SWING ANALYSIS APPARATUS AND METHOD

FIELD OF INVENTION

This invention relates to a golf swing analysis apparatus and method which digitizes video images with respect to a fixed reference frame by use of specialized software that extracts and plot the displacement, velocity, and acceleration of specific body parts relative to each other and the reference frame for particularized analysis of the golf swing.

BACKGROUND OF THE INVENTION

Golf is a game of skill requiring exacting coordination in order for a player to bring a relatively small club face in proper contact with an even smaller golf ball. Furthermore, while proper contact is important, a player must generate sufficient power through the swing in order to impart sufficient energy to the golf ball which translates into distance. The ball must travel far enough to clear obstacles and advance enough with each shot in order to be able to attain a low score of which is the object of the game.

Over approximately the last 75 years, a large part of the effort to improve scores has concentrated on incorporating modern materials and manufacturing techniques into the making of golf clubs, golf balls, and other related equipment. Such efforts have proven to be generally ineffective in that the average score of professional tour players during this time period has dropped by only 1–2 strokes per round. Hence, while modern equipment which incorporates space-age materials and design is important, an understanding of the mechanics of an individual golfer's swing can be even more important towards lowering a golfer's scores.

Since the 1970's, universities and private research foundations have studied human motion using techniques that allow two-dimensional film or videotape to be processed into three-dimensional data. Progress had been made in characterizing the properties of human motion (biomechanics) from the simple measurements of displacement, velocity, and acceleration to the more complicated measurements of force and torque (stress). Although the scientific community has taken steps towards understanding human motion and its effects upon the musculosketal system, very little of this information has been applied to the clinical area where a patient can directly benefit.

A variety of prior art disclosures have presented devices and methods for analyzing golf swings. U.S. Pat. No. 4,163,941 discloses a video device and method which detects the club head velocity via a colored club head and color detection unit. The club head velocity is then displayed in analog or digital form. A series of swings can then be analyzed by comparing the relative club head velocities for different club swings.

U.S. Pat. No. 5,210,603 discloses an automated video vending device which videotapes a user's golf swing and dispenses the videotape for later viewing by the user.

U.S. Pat. No. 5,249,967 discloses a video system which displays a live video signal of a golfer's swinging motion for the golfer to see while swinging. A series of video overlays can be imposed upon the video signal for reference and analysis purposes.

U.S. Pat. No. 5,333,061 discloses an apparatus and method which uses a computer to produce a series of still images from a videotape of a golfer's swing. The still images are then overlaid with a series of corrected images which include lines depicting proper form. The result is then augmented with further visual or audio information and recorded onto another tape for viewing and analysis.

U.S. Pat. No. 5,342,054 discloses a golf practice apparatus which provides recording and instant playback of video images of a golfer's swing. An infrared camera and flash unit are used to obtain snapshot images of the clubhead and ball just before and after impact. An optical sensor array and processor calculates statistical data on club speed, ball speed, and ball angle.

U.S. Pat. No. 5,419,562 discloses a method and apparatus for measuring the force on weight pads underneath an individual's feet. The signals are plotted to enable analysis of the variation in weight distribution and dynamic forces on the feet during the activity.

What is lacking in the field is a golf analysis apparatus and method which is capable of individually and selectively capturing and plotting the movement of specific body parts and/or equipment parts in relation to each other so as to maximize the kinetic link of forces imparted to the ball. As a golf swing is executed, the golfer rotates, among other things, the hips, shoulders, and arms in a sequential, and yet coordinated fashion. To maximize energy in the swing, the golfer should smoothly transfer energy from the hips to the shoulders, and should smoothly transfer energy to the arms. Accordingly, the individual can adopt more efficient techniques for performing the given task which will increase the individual's performance potential, while simultaneously lower the risk of injury.

Hence, what is needed is an analysis technique for recording a golfer's swing from several angles, whereby individual points or segments on the golfer's body and the equipment can be tracked through a range of motion and speeds. Specialized software can then be used to process this data and generate a series of plots which will demonstrate the most efficient kinetic link between the golfer's body segments. The plots should be generated to facilitate straightforward analysis of the energy transfer between body segments as kinetically linked to impart energy to the golf ball.

SUMMARY OF THE INVENTION

The instant invention is an apparatus and method for analyzing the kinetic link between body parts during a golfer's swing. The basic concept involves breaking down the total motion of a given task, such as a golf swing, into individual units of motion. Each unit of motion can be assessed using motion analysis and biomechanics technology. Once assessed, each unit of motion can be trained and perfected. The total motion is then built up from the foundational units of motion. The body is neuromechanically and physically educated to link each unit in a coordinated fashion. The net result is an efficient total motion which will increase the individual's performance potential, while at the same time decrease the risk of injury while performing the given task.

In utilizing the apparatus and method, a golfer enters a test station and performs one or more swings for recording by the apparatus. A testing station includes a rubber mat or flooring material for striking a ball into a backdrop net. A first and second video camera are placed at particular angles and distances from the test subject and connected to a software/hardware station. The first camera is placed directly facing the golfer, and the second camera is placed slightly behind the golfer at an acute angle to the first camera. The cameras record the video images on a video cassette recorder (VCR). Two dimensional (2-D) feedback can also be provided via a monitor feed from either of the video cameras, or via appropriately placed mirrors.

After the test subject is videotaped, a global three dimensional (3-D) coordinate system is established by videotaping a reference structure consisting of a cube-like frame with known dimensions and reference points. The moving video images are then processed on a frame-by-frame basis through the aid of the computer to establish the relative movement, velocity, and acceleration of various selected body segments in the global coordinate system. The movement data is then compiled in a time sequenced fashion and processed by the specialized golf analysis software.

The software generates a series of superimposed plots for parameters such as body segment rotational displacement, hip to shoulder segment displacement, club lag displacement, kinetic link of body segment angular velocities, and 3-D club head speed and resultant components. These displacement, velocity, and acceleration plots graphically illustrate the dynamic movement of individual joints, body segments, and equipment. Through interpretation of these plots, a golfer can determine inefficiencies in his/her swing and thereafter apply training and correction techniques to more properly achieve an optimum kinetic link between the body segments.

It is therefore an object of the present invention to provide an apparatus and method for analyzing a golf swing which captures and plots the kinetic motion link between various body segments.

It is a further object of the present invention to provide a test station for videotaping a golfer's swing from multiple angles and establishing a 3-D global reference frame whereby the video images can be individually processed for various body segments into global displacement, velocity, and acceleration data.

It is still another object of the present invention to provide specialized software for processing the body segment motion data into graphical plots which facilitate analysis of the kinetic motion link between the body segments.

It is a further object of the present invention to provide specialized software that can be applied or easily modified to facilitate analysis of a variety of activities including, for instance, golf, baseball, tennis, occupational efforts, and/or rehabilitation movements.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 2 shows a general flow chart for processing and analyzing the collected positional data information.

FIG. 3 shows a first section of a flow chart of the specialized software for processing and analyzing the collected positional data.

FIG. 3D shows a flow chart of the joint range of motion displacement calculation.

FIG. 3E shows a flow chart of a first method of spine angle calculation.

FIG. 3F shows a flow chart of a second method of spine angle calculation.

FIG. 4A shows a graphical plot of body segment rotational displacement, but for a relatively inefficient golf swing.

FIG. 5 shows a graphical plot of hip and shoulder segment angular displacement, and dynamic separation between the hip and shoulder for each point in time, for an efficient golf swing.

FIG. 5A shows a graphical plot similar to FIG. 5, which also includes arm segment angular displacement, but for a relatively inefficient golf swing.

FIG. 6 shows a graphical plot of the kinetic link between body segment angular velocities for an efficient golf swing.

FIG. 6A shows a graphical plot similar to FIG. 6, but for a relatively inefficient golf swing.

FIG. 7 shows a graphical plot of the club lag displacement for an efficient golf swing.

FIG. 7A shows a graphical plot of the club lag displacement, but for a relatively inefficient golf swing.

FIG. 8 shows a graphical plot of the club head linear speed and X, Y, Z components for an efficient golf swing.

FIG. 8A shows a graphical plot of the club head linear speed and X, Y, Z components, but for a relatively inefficient golf swing.

DETAILED DESCRIPTION OF THE PREFERRED EMBODIMENT

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 1:
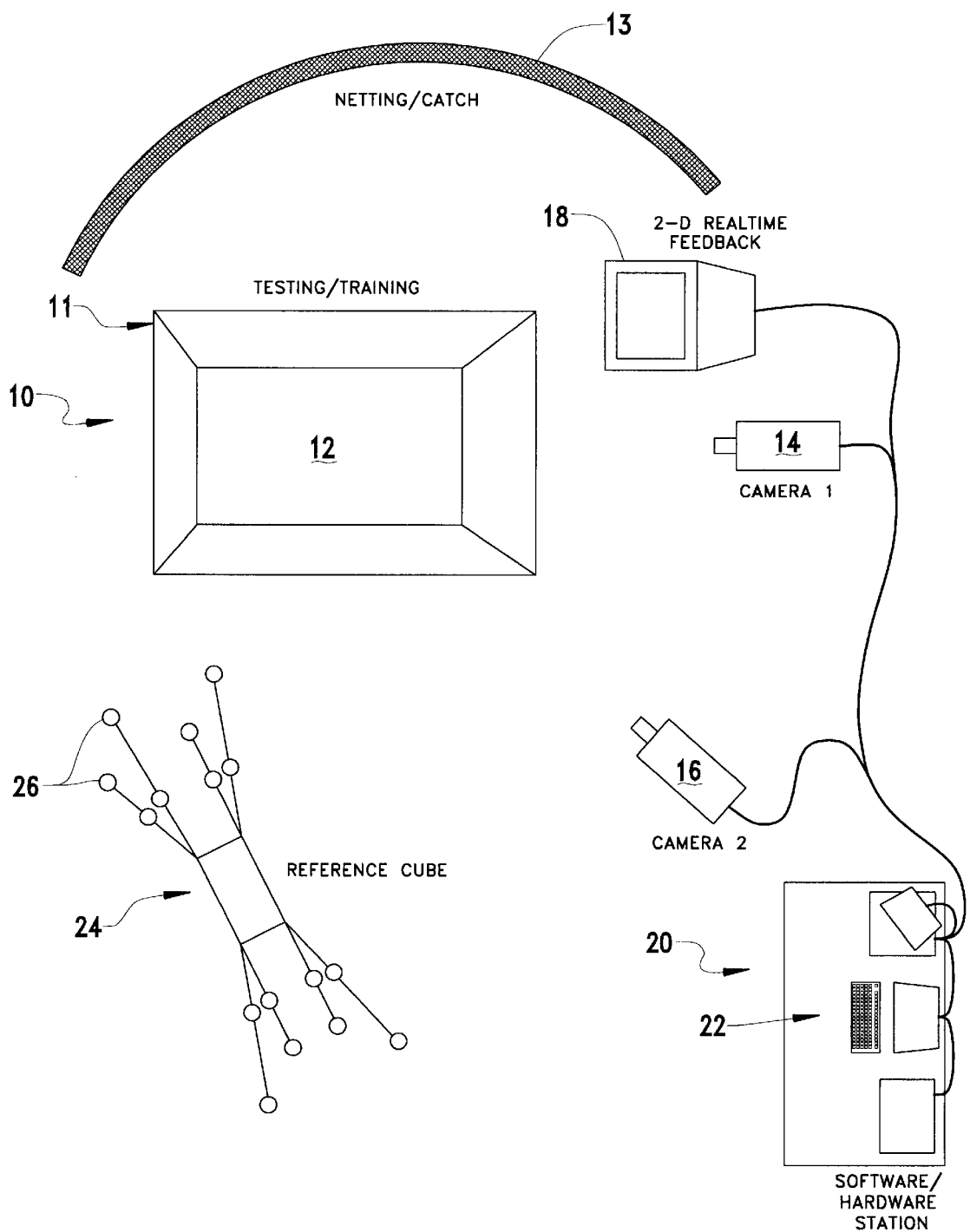
FIG. 1 shows an overview of the test station layout and the associated video and computer hardware for capturing and processing the video images.

Referring now to FIG. 1, a test station setup 10 is shown which is comprised of the necessary hardware and testing implements to facilitate analysis of a test subject's movements. As shown, a testing/training area 11 is defined with a pad or flooring material 12 included for the test subject to stand on and perform the swing or training methods involved. A backdrop catch or netting 13 is used to impede balls which might be hit during testing. A first camera 14 is oriented facing the test subject and a second camera 16 is placed behind the test subject at an acute angle from the first camera 14. While the shown camera placement is used, the cameras 14 and 16 might be placed anywhere at known distances around the test subject. Additionally, while 2 cameras are sufficient to obtain 3-D displacement data of objects in the reference frame, more cameras might be used as desired or necessary. In this instance, the first camera 14 includes a video feed which leads to a monitor 18. This monitor 18 is used to provide real-time 2-D feedback of the test subject's activities. Such feedback from either camera can be useful for training purposes and camera alignment. Mirrors (not shown) might also be used.

The cameras 14 and 16 are connected to VCR's located at a hardware/software station 20. This station 20 includes video processing and monitoring equipment as controlled by a central computer 22. In operation, a test subject, not shown, is videotaped performing a golf swing or other action in the testing/training area 11. A reference cube 24 with known dimensions and reference points 26 is subsequently filmed to aid in establishing a global reference frame. Individual frames of the video are then analyzed and correlated to establish displacement, velocity, and acceleration data for moving objects within the video frames.

Referring now to FIG. 2, a high level flowchart 30 is shown regarding the progression of information through the analyzation procedure. As shown in step 32, the activity of interest, e.g. a golf swing, is videotaped in two dimensional format from two different camera angles. Step 34 shows the subsequent videotaping of the reference cube from the same two camera angles. A series of steps 36 is then applied to the captured video data. The embodied version of the present invention uses a video based system sold under the trademark PEAK PERFORMANCE.

With this video/software system, step 38 shows that a global reference frame environment is created through digitization of the reference cube video images for each camera angle. In the next step 40, the subject activity, e.g. a golf swing, is digitized on a frame by frame basis for the specific frames desired. In step 42, the 3-D displacement information is generated by digitizing each frame of video needed for a particular analysis. The individual 3-D position of each point in the spatial reference frame is identified, and sequential data files of the relative 3-D movement are compiled and stored in ASCII data files. While PEAK PERFORMANCE is used for these analysis steps, other such video analysis software might also be used. In step 44, the 3-D information files are read and analyzed by the specialized analysis software of the present invention which subsequently generates graphical plots of the data.

Referring now to FIG. 3, a high level flowchart of this specialized analysis software is shown. In general, this software performs routines for linking various biological parameters together for analysis and is hence referred to as "Biolink" analysis software. For the particularized analysis of a golf swing, FIG. 3 shows flowchart steps for related analysis software sold under the trademark "Golflink." As shown in step 46, the 3-D positional data is read from the aforementioned ASCII data files into designated arrays for convenient and fast data management. In step 48, a global 3-D coordinate system is created using information from the environment and the videotaped data of the 3-D reference cube. Next, step 50 shows the calculation of body segment vectors and mid-points which will be used in subsequent analysis calculations.

With such arrays and preliminary calculations established, the analysis is calculations 52 can begin. In step 54, the 3-D velocity of the clubhead using the established global coordinate system is first calculated. As such, the 3-D components in the global X, Y, and Z axes are established and a resultant velocity is calculated therefrom.

Figure 3A:
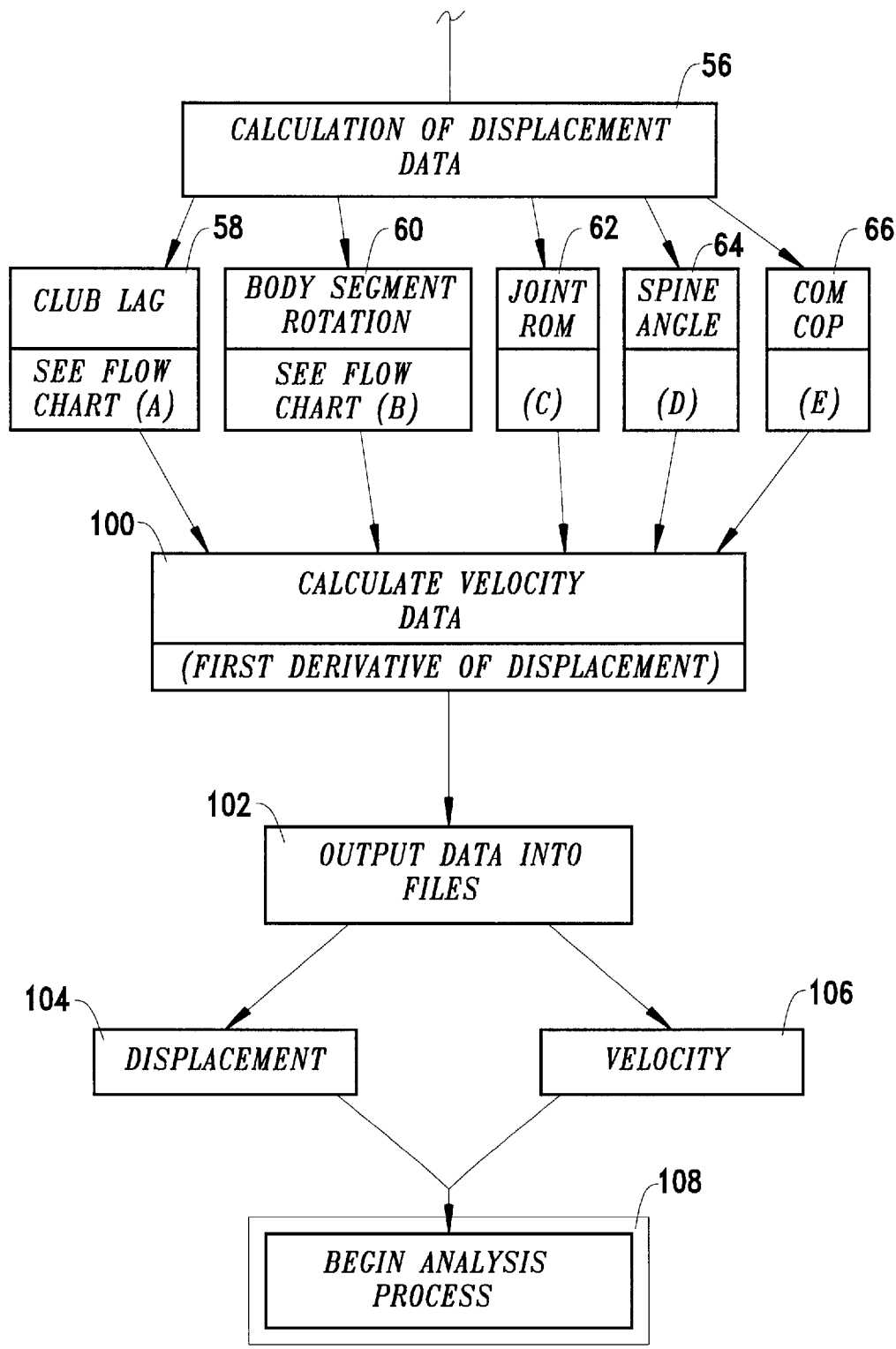
FIG. 3A shows the continuing second section of the flow chart of FIG. 2.
Figure 3B:
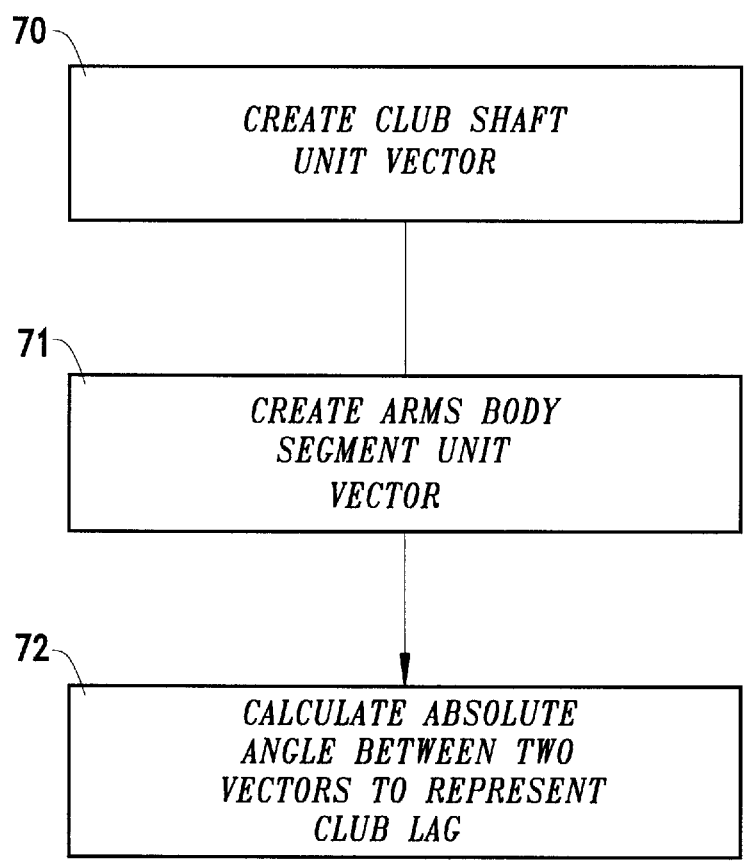
FIG. 3B shows a flow chart of the club lag displacement calculation.

Referring now to FIG. 3A, the high level flowchart of FIG. 3 continues in step 56 with the general calculation of displacement data for the various parameters desired. For instance, in this example the displacement calculations include club lag 58, body segment rotation 60, joint range of motion (ROM) 62, spine angle 64, and center of mass and center of pressure 66. FIGS. 3B–3G further describe each of these calculations.

Referring now to FIG. 32, a flow chart of the club lag displacement calculation steps are shown. In step 70, a club shaft unit vector is created. In step 72, an arms body segment unit vector is created. The absolute angle between the two vectors is then calculated in step 72 to represent club lag.

Figure 3C:
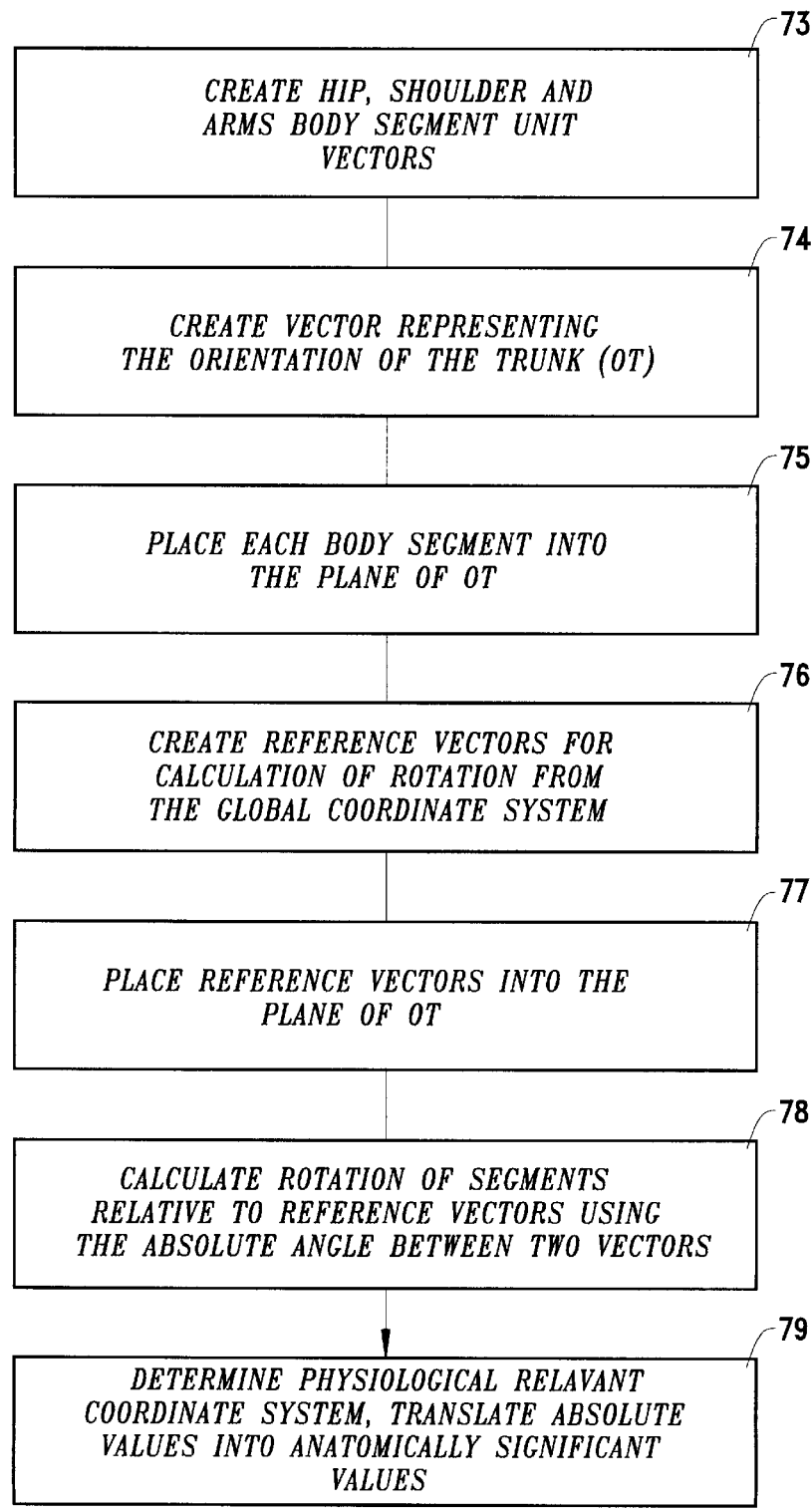
FIG. 3C shows a flow chart of the body segment rotation displacement calculation.

Referring now to FIG. 3C, a flow chart of the body segment rotation calculation steps are shown. Step 73 shows the creation of the hip, shoulder and arms body segment unit vectors. In step 74, a vector is created representing the orientation of the trunk (OT). In step 75, each body segment is then placed into the plane of the OT. Reference vectors are created in step 76 for the calculation of rotation from the global coordinate system, and in step 77 the reference vectors are placed into the plane of the OT. In step 78, the rotation of segments relative to the reference vectors are calculated using the absolute angle between two vectors. Next a physiologically relevant coordinate system is determined in step 79, and the absolute values are translated into anatomically significant values.

Referring now to FIG. 3D, a flow chart of the joint range of motion (ROM) calculation steps are shown. In step 80, a 3-D reference frame is created for the joints, e.g. the shoulders, elbows, and knees. In step 81, a body segment unit vector is created which is relevant to each joint. In step 82, the body segment unit vectors are projected into each of the relative planes of motion of the joint reference frame. Next, an anatomically relevant coordinate system for each plane of motion for each joint is created in step 83. Finally, in step 84 the movement of each body segment through each plane of motion is calculated, thereby creating the measurement of full 3-D ROM for each joint.

Referring now to FIG. 3E, a flowchart of a first method of calculating the spine angle is shown. In step 85, a vector is created representing the orientation of the trunk (OT). Step 86 involves projecting the OT onto the global reference frame's XZ-plane and YZ-plane. Then, in step 87, the absolute angle between the Z-axis and the projected OT is calculated in both the XZ and YZ-planes.

Referring now to FIG. 3F, a flowchart of a second method of calculating the spine angle is shown. In step 88 the hip segment vector is created, and in step 89 a vector representing the orientation of the trunk (OT) is created. In step 90 both vectors are used to create an anatomical reference frame from trunk movement, e.g. flexion, extension, and lateral side bending. In step 91, trunk movement relative to the anatomical reference frame coordinate system is calculated by projecting the OT into the pelvic reference frame.

Figure 3G:
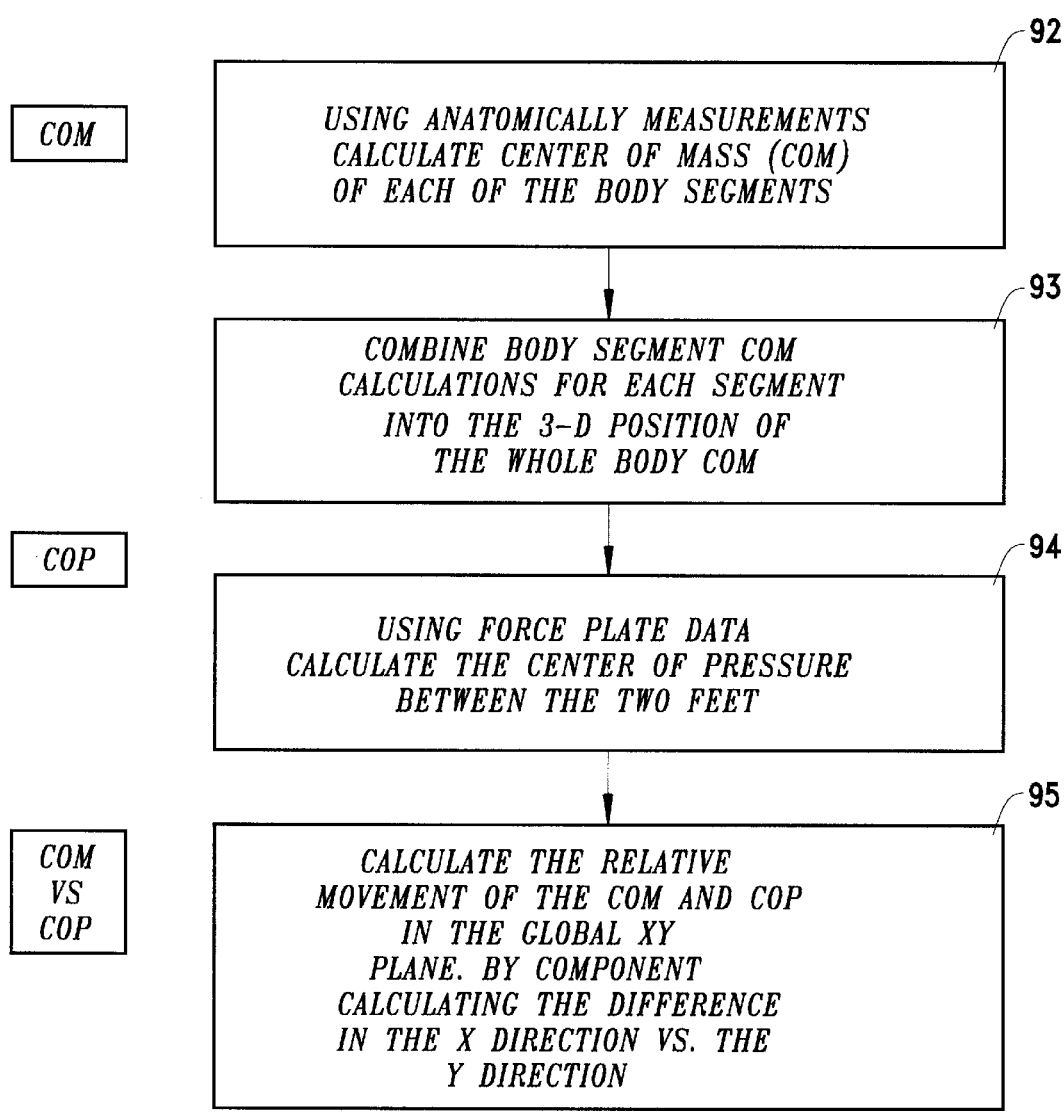
FIG. 3G shows a flow chart of the center of mass and center of pressure calculation.

Referring now to FIG. 3G, a flowchart is shown for calculating the center of pressure (COP) versus the center of mass (COM). Step 92 uses anatomical measurements to calculate the center of mass of each body segment. In step 93, the body segment COM calculations for each segment are combined into the 3-D position of the whole body COM. Step 94 shows the calculation of the center of pressure between the two feet using force plate data. In step 95 the COM and COP calculations are contrasted by calculating the relative movement of the COM and COP in the global XY-plane by calculating each component difference in the X-direction and the Y-direction.

Referring again to FIG. 3A, the displacement data can be used to calculate velocities as per step 100 for each of the displacement data quantities by taking the first derivative over time of each displacement. The respective output data is written into data files 102, as separated by displacement 104 and velocity 106. Similarly, accelerations may also be calculated by taking the second derivative over time of the displacement data. Once the desired data is calculated and established, a series of plots can be generated and analysis of the kinetic links between the parameters can be performed as shown in step 108.

Figure 4:
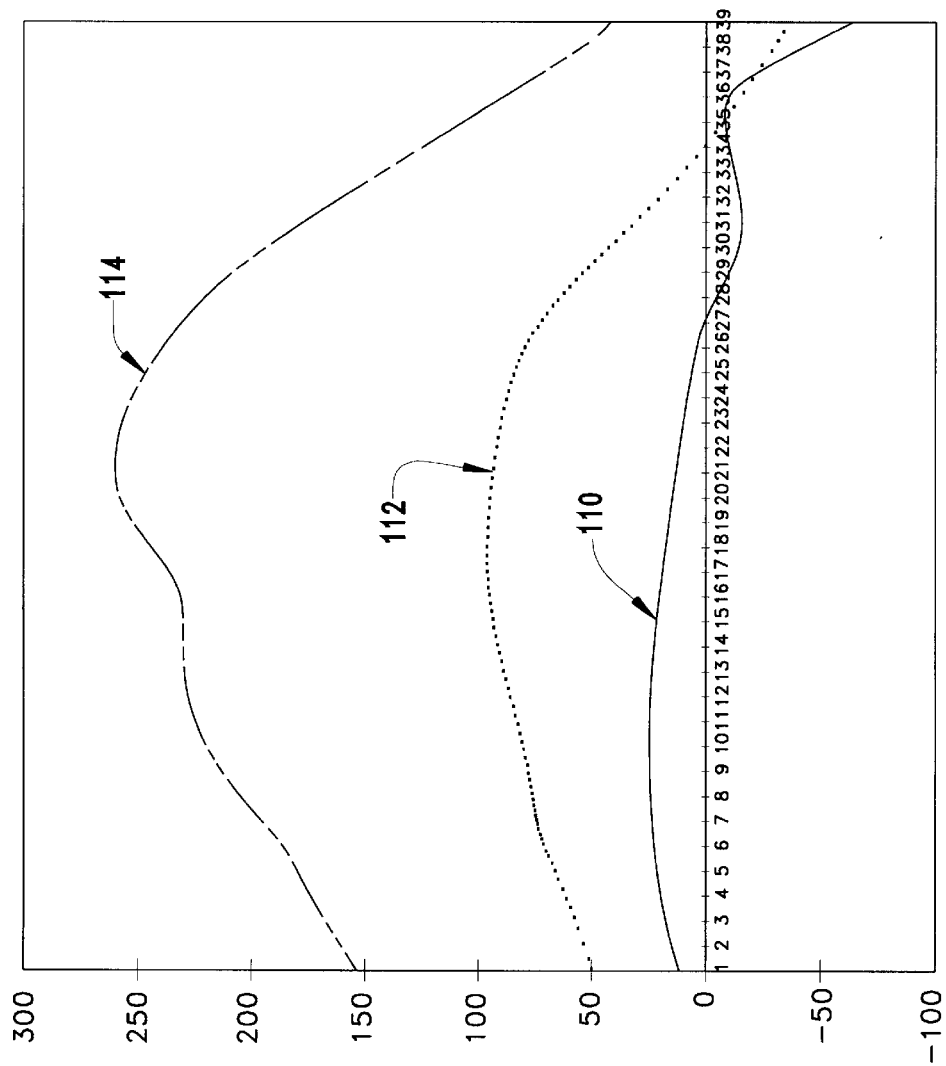
FIG. 4 shows a graphical plot of body segment rotational displacement for an efficient golf swing.

Referring now to FIGS. 4–6, a series of graphical plots has been generated for various parametric relationships. While any series of plots might easily be generated from the corresponding 3-D data points and their derivatives, the included plots have been found to be extremely useful for analyzing the kinetic link between body segments in a golf swing.

FIG. 4 shows a graph of the angular displacement in degrees of various body segments as plotted against one another for an efficient golf swing. The vertical Y-axis represents the displacement angle in degrees and the horizontal X-axis represents the relative frame number in the sequence of frames plotted. The graph shows the amount of rotational displacement of body segments including the hip (solid line), shoulders (short-dashed line), and arms (long-short-short dashed line) as plotted against each other. Such a graph allows the analyst to see static rotational positions, for instance the maximum rotation for each segment. More importantly, however, the superimposed graph allows the analyst to compare the relative interaction and dynamics of each body segment.

This particular graph is used to analyze how efficiently the muscles are loaded between each body segment, and the coordination involved in starting the kinetic link. This graph demonstrates good overall body mechanics and efficient loading of the muscles. As shown, the hips reach a maximum displacement 110 before the shoulders 112. The shoulders 112 reach a maximum displacement before the arms 114. Hence, each body segment reaches an unencumbered amount of rotation, thereby achieving maximum muscular loading (rotational displacement) and creating optimal power generating potential.

Typical flaws found in an inefficient swing would include the shoulders reaching a maximum rotation and starting to unload in the opposite direction before the hips have reached their maximum rotational displacement. This situation diminishes the muscle loading of the body trunk musculature and therefore diminishes the overall efficiency of the kinetic link.

Referring to FIG. 4A, a similar plot to FIG. 4 is shown for a relatively inefficient swing of an amateur golfer. As compared to FIG. 4, this plot demonstrates yet other problems. While the peak hip rotation displacement 111 occurs before the peak shoulder displacement 113, this golfer does not fully utilize proper hip rotation because the hip displacement (solid line) is shown to not rotate through to negative displacements. In other words, this golfer does not efficiently utilize hip and leg movement to kinetically add to the power in the swing, and instead over-utilizes his arms. Moreover, the arm rotation displacement peak 115 occurs before the shoulder rotation displacement peak 113 which further indicates inefficient kinetic transfer between the shoulders and the arms. Note also that the dip 200 in arm rotation occurs as a result of both elbows bending, followed by a combination of arm rotation and trunk twisting.

Referring now to FIG. 5, a graph is shown which is more specifically used to analyze the loading of the musculature of the trunk. The angular displacement in degrees of various body segments are plotted against one another, with the vertical Y-axis representing the displacement angle in degrees and the horizontal X-axis representing the relative frame number in the sequence of frames plotted. In this graph the hip (solid line), shoulder (short-dashed line), and arm (long-dashed line) body segment rotations are plotted against each other. The dynamic separation between the hips and shoulders (long-short-short dashed line) has additionally been calculated for each point in time during the swing. The dynamic separation is an important analysis aid in assessing the dynamic nature of the muscle loading. The plots in FIG. 5 demonstrate a very dynamic loading of the musculature, which in turn produces optimal power generation. Ideally, these plots should show a peak in the dynamic separation in the downswing portion of the movement 118. A steep angle or slope in the dynamic separation 120 should occur thereafter. This transition shows shoulder segment acceleration, muscle contraction (e.g. stretch-shorten cycle), and the passing of momentum from the hips to the shoulders. Note that the end of the stretch (muscular) occurs as the hips accelerate faster than the shoulders followed by contraction 120, and shoulder acceleration and hip deceleration or energy transfer. As with FIG. 4, the peak hip rotation displacement 172 occurs before the peak shoulder displacement 122, which occurs before the peak arm rotation displacement 170.

Typical flaws found in an inefficient swing would include the peak of the black line 116 occurring before, or equal to, the point of maximum shoulder rotation 122. In other words, the maximum angular separation between the shoulders and hips should occur only after the shoulders have rotated through their maximum displacement angle. Any other relation between the hips and shoulders would demonstrate a less than dynamic loading of the muscles, thereby diminishing the effect of muscle preloading and the subsequent generation of power.

For example, FIG. 5A shows a plot similar to FIG. 5, but for a relatively inefficient golf swing of an amateur golfer. For this swing, the hip rotation displacement (solid line) properly rotates to a maximum displacement 117 before the maximum angular displacement 119 of the shoulders (short-dashed line). This indicates a relatively efficient transfer of energy and momentum from the hips to the shoulders as before. However, the dynamic separation between the hips and shoulders (long-short-short-dashed line) shows a peak 121 with an erratic slope 123 leading up to zero. Note also that the "stepped" muscular contractions, as shown by areas 202 and 204, result in less power overall. Such "stepping" indicates mechanically disadvantaged body positions.

Additionally, the peak 121 in the dynamic separation occurs before the downswing portion of the movement 118. The peak also occurs close to the point of maximum angular shoulder displacement. As pointed out above, this shows inefficient and diminished muscle loading. Other inefficiencies include the dip 125 in the arm displacement plot (long-dashed line). This dip 125 occurs after the peak rotational displacement 129 for the arms. Ideally such peak displacement should occur near the next relative peak 127. Also, as per FIG. 4A, the dip 125 in arm rotation occurs as a result of both elbows bending, followed by a combination of arm rotation and trunk twisting. Such shifting of the peak displacements and general wavering of the arm rotational displacement plot indicates an inefficient biokinetic link between the shoulders at 119 and the arms at the relative peak 127.

Yet another inefficiency revealed by this plot is the relative lack of hip movement and lower body movement throughout the swing. As the plot shows, the hip displacement never crosses over to the negative scale as demonstrated in the efficient swing of FIG. 5. Hence, this plot reveals a common problem among amateur golfers which is a swing comprised almost entirely of upper body movement, i.e. an "arm swing," with stationary hips. Given that the legs are generally the most powerful muscular appendage on the human body, a considerable amount of power and efficiency is lost in the kinetic link where the hips remain stationary. As per this plot, this golfer should make efforts to kinetically link more so his hips into the golf swing action in order to improve power in his swing.

Referring now to FIG. 6, yet another inter-relational graph is shown which is particularly valuable in determining the efficiency of power generation. In this graph, the angular velocities of body segments including the hips (solid line), shoulders (long-dashed line), arms (short-dashed line), and club release speed (long-short-short dashed line) are plotted on the same chart. When analyzed, this graph illustrates how each body segment works together to generate speed and pass energy and momentum through the kinetic link.

The particular plots in FIG. 6 demonstrate optimal relational mechanics for generating power. As shown, the hip segment accelerates to a maximum velocity 124, and then decelerates. At this point 124, the shoulder segment is passed energy, e.g. "conservation of momentum," as the shoulders continue to accelerate. The shoulder movement, combined with the action of the muscles of the trunk, accelerate the shoulders to the maximum velocity 126. The shoulders and hips then decelerate and pass energy and momentum to the arms. This in turn causes the arms to accelerate to a maximum velocity 128. The arms then decelerate, thereby causing the culmination of energy to be passed to the club as shown by the maximum club release speed 130. The sum of these actions accelerates the club in an optimum fashion thereby resulting in maximum impact with the ball.

As per the graph in FIG. 6, a typical flaw which would demonstrate an inefficient swing includes a lack of lower body involvement, or hip sliding, which would graphically result in a slowly increasing hip speed without a clear deceleration. Such a condition would detract from the energy which is ultimately passed to the shoulders. Another inefficiency would include an upper body swing where the arms accelerate early, thereby causing the club to accelerate prematurely and cast forward. Of course, all break downs in the idealized kinetic link will cause a loss of efficiency and power.

Referring now to FIG. 6A, a plot similar to FIG. 6 is shown, but for a relatively inefficient amateur swing. As shown, the rotational velocity of the hips (solid line) and the arms (long-short-dashed line) waivers across the zero line indicating no steady acceleration and deceleration for these body segments. Despite these inefficiencies, a kinetic link can be seen originating at the relative peak 131 on the hip plot. This peak has a value of 194 degrees per second at frame 28. Energy is then transferred to the shoulders (short-dashed line) which peak at 132 with a value of 689 degrees per second at frame 32. The next relative peak 135 occurs in the arm plot with a value of 757 degrees per second at frame 36. Energy is then transferred to the club (long-short-short-dashed line) which peaks at point 137 with a value of 1005 degrees per second at frame 139. Impact with the ball occurs at frame 46. Hence, while a kinetic link can be charted for this swing, the inefficiencies surrounding this transition indicate inconsistent results and wasted motion by the golfer.

Referring now to FIGS. 7 and 7A, the club lag displacement is shown plotted (solid line) for an efficient golf swing 140 in FIG. 7, and plotted as 141 a relatively inefficient golf swing in FIG. 7A. The vertical Y-axis represents the displacement angle in degrees and the horizontal X-axis represents the relative frame number in the sequence of frames plotted.

Referring now to FIGS. 8 and 8A, the club head linear speed 142 is shown plotted (solid line) for an efficient golf swing in FIG. 8, and plotted as 143 for relatively inefficient golf swing in FIG. 8A. The vertical Y-axis represents the velocity in meters per second and the horizontal X-axis represents the relative frame number in the sequence of frames plotted. The component parts in the X, Y, and Z direction are used to calculate the overall linear speed. In FIG. 8, the X-linear component 144 is shown by the short-dashed line; the Y-linear component 146 is shown by the long-short-short-dashed line; and the Z-linear component 148 is shown by the long-dashed line. This plot is particularly effective to demonstrate the increase in club head speed that results when a test subject more effectively links the kinetic body movements as shown in FIG. 6.

Conversely, in FIG. 8A, the X-linear component 145, Y-linear component 147, and Z-linear component 149 are used to derive the club linear speed 143 for an inefficient golf swing. As shown by the peaks 150 and 152 in the early stages of the swing, energy is wasted before being regenerated into the peak at 154. In FIG. 8, the linear components generally ramp up to generate a peak club head linear speed 156 of approximately 39 meters per second. In FIG. 8A, the largest peak 152 occurs well before club impact. Additionally, the peak 154 immediately before club impact is only around 15 meters per second. These plots suggest that if the inefficiencies occurring around peaks 150 and 152 could be eliminated and the energy properly re-focused to a peak 154 immediately before club impact, then higher impact speeds might result.

As mentioned previously, a series of graphical plots has been generated for various parametric relationships. While any series of plots might easily be generated from the corresponding 3-D data points and their derivatives, the included plots have been found to be extremely useful for analyzing the kinetic link between body segments in a golf swing. Additionally, while the plots are shown with different line characteristics to delineate different body motions, colored delineations have also been found to be very useful. With colored plots, the same individual colors would continually be used to show certain body motions. Accordingly, a user or analyst can quickly glance at a plot and separate out, for instance, arm rotational speed in red versus shoulder rotational speed in green versus hip rotational speed in blue, etc.

As a result of such analysis of the various graphs, individualized inefficient movements of a player's swing can be identified and corrected. This is based on the precept that any activity that entails dynamic human motions is composed of individual units of motion that are linked together in a coordinated manner. Hence a system of drills and exercises can be implemented which allows the body to develop neuromuscular control and skills to efficiently perform each unit of motion that makes up the total movement. Specific drills are assigned to individuals with specific deficits and/or mechanical and physical weaknesses during the activity, i.e. a golf swing. A typical training program will coordinate the drills and exercises so that as the program progresses, the client reduces the amount of attention spent on units of motion and emphasizes coordinating the entire motion. The program's goal, therefore, would be to develop functional strength, range of motion, and most importantly, muscular coordination. As a result, the program's drills would not replace a good golf swing technique. Such drills would simply train an individual's body to move more efficiently, and with increased performance potential.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and descriptions.

What is claimed is:

1. An apparatus for analyzing a golf swing comprising:
   a test station including at least two videotaping means placed at different angles for capturing a test subject performing a swing in a testing area;
   a hardware station including at least one video recorder for storing said images of a test subject performing a swing in a testing area, a video processing means for manipulating said images, a reference frame means for providing relative position data of selected elements in said images, and a computer with memory for storing and running analysis software means, a graphical plotting means for generating visual output in response to input from said computer;
   wherein said analysis software means includes:
   (I) software means for creating a digitized global reference frame with an X, Y, and Z-axis, and with an XY and XZ-plane;
   (ii) software means for digitizing said videotaped golf swing activity and producing frames of video data;
   (iii) software means for digitally isolating each said frame of video data so that chosen body segments can be three-dimensionally determined and compiled in relation to a global reference frame;
   (iv) software means for calculating segment vectors and midpoints for said chosen segments;
   (v) software means for calculating the three dimensional velocity of the clubhead;
   (vi) software means for calculating displacement data for said chosen segments;
   (vii) software means for calculating velocity data from said displacement data;
   (viii) software means for outputting said displacement and velocity data into files for data plotting on said plotting means, said chosen segments simultaneously plotted on a common graphical axis to facilitate application of an analysis means for determining the kinetic link between said chosen segments.

2. The apparatus for analyzing a golf swing of claim 1, wherein one said chosen segment includes club lag which is calculated by a lag-calculation-generating software means which creates a club shaft unit vector; creates an arms body unit vector; and calculates the absolute angle between the two vectors which represents club lag.

3. The apparatus for analyzing a golf swing of claim 2, wherein one said chosen segment includes body segment rotation which is calculated by a rotation-calculation-generating software means which creates hip, shoulder, and arms body segment unit vectors; creates a vector representing the orientation of the trunk, OT; places said each body segment into the plane of the OT; creates reference vectors for calculation of rotation from the global coordinate system; places said reference vectors into the plane of the OT; calculates rotation of said segments relative to said reference vectors by using the absolute angle between said vectors; and determines a physiologically relevant coordinate system by translating absolute values into anatomically significant values.

4. The apparatus for analyzing a golf swing of claim 3, wherein one said chosen segment includes joint range of motion which is calculated by a range-of-motion-calculation-generating software means which creates a three-dimensional reference frame for joints; creates body segment unit vectors relevant to each joint; projects body segment unit vectors into each of the relative planes of motion of said joint reference frames; creates an anatomically relevant coordinate system for each said plane of motion for each said joint; and calculates the movement of each said body segment through each said plane of motion, thereby creating the measurement of full three-dimensional range of motion for each said joint.

5. The apparatus for analyzing a golf swing of claim 4, wherein one said chosen segment includes spine angle which is calculated by an-absolute-spine-angle-calculation-generating software means which creates a vector representing the orientation of the trunk, OT; projects the OT into said global reference frame's XZ-plane and YZ-plane; and calculates said spine angle from said absolute angle between said Z-axis and said projected OT in both said XZ and YZ-planes.

6. The apparatus for analyzing a golf swing of claim 5, wherein one said chosen segment includes spine angle which is calculated by a relative-spine-angle-calculation generating software means which creates a hip segment vector; creates a vector representing the orientation of the trunk, OT; creates an anatomical reference frame for flexion, extension, and lateral side bending trunk movement using said hip and OT vectors; and projecting the OT into a pelvic hip reference frame, and calculating spine angle movement relative to said anatomical reference frame.

7. The apparatus for analyzing a golf swing of claim 6, wherein center of pressure versus center of mass is calculated by a center-of-mass-versus-center-of-pressure-calculation generating software means which uses anatomical measurements to calculate the center of mass of each of said body segments; combines body segment center of mass calculations for each segment into the three-dimensional position of the whole body center of mass; uses data from force plates to calculate the center of pressure between the test subject's feet; calculates the relative movement of the center of mass and center of pressure in the global XY-plane by component calculating the difference in the X-direction versus the Y-direction.

8. The apparatus for analyzing a golf swing of claim 1, wherein said data plotting includes hip rotation displacement, shoulder rotation displacement, and arm rotation displacement simultaneously plotted in degrees on the vertical-axis with the corresponding sequential frame number for said data plotted on the horizontal-axis.

9. A method of analysis which includes generation of said graphical plot of claim 8, and which includes the steps of:
   locating the peak of said hip rotation displacement;
   locating the peak of said arm rotation displacement;
   locating the peak of said shoulder rotation displacement;
   comparing the occurrence of said arm rotation displacement peak with the occurrence of said hip rotation displacement peak;
   comparing the occurrence of said shoulder rotation displacement peak with the occurrence of said arm rotation displacement peak.

10. The apparatus for,analyzing a golf swing of claim 1, wherein said data plotting includes hip/shoulder separation, hip rotation displacement, and shoulder rotation displacement simultaneously plotted in degrees on the vertical-axis with the corresponding sequential frame number for said data plotted on the horizontal-axis.

11. A method of analysis which includes generation of said graphical plot of claim 10, and which includes the steps of:

locating the peak shoulder rotation displacement and a downswing portion thereafter;

locating the peak hip/shoulder separation and a transition thereafter;

comparing the occurrence of said peak hip/shoulder separation with the occurrence of said peak shoulder rotation displacement in said downswing portion;

determining whether said hip/shoulder separation transition slopes steeply upwards through zero degrees after said peak.

12. The apparatus for analyzing a golf swing of claim 1, wherein said data plotting includes club lag displacement plotted in degrees on the vertical-axis with the corresponding sequential frame number for said data plotted on the horizontal-axis.

13. The apparatus for analyzing a golf swing of claim 1, wherein said data plotting includes hip rotation speed, shoulder rotational speed, arms rotational speed, and club release speed simultaneously plotted in degrees per second on the vertical-axis with the corresponding sequential frame number for said data plotted on the horizontal-axis.

14. A method of analysis which includes generation of said graphical plot of claim 13, and which includes the steps of:

locating the peak of said hip rotational speed;

locating the peak of said shoulder rotation speed;

locating the peak of said arms rotation speed;

locating the peak of said club release speed;

comparing the occurrence of said shoulder rotation speed peak with the occurrence of said hip rotation speed peak;

comparing the occurrence of said arms rotation speed peak with the occurrence of said shoulder rotation speed peak;

comparing the occurrence of said club release speed peak with the occurrence of said arms rotational speed peak.

* * * * *